US012774837B2

(12) United States Patent
Hiratsuka et al.

(10) Patent No.: US 12,774,837 B2
(45) Date of Patent: Oct. 27, 2026

(54) OIL SEPARATOR FOR COMPRESSOR AND COMPRESSOR FOR CRYOGENIC REFRIGERATOR

(71) Applicant: Ulvac Cryogenics Incorporated, Chigasaki (JP)

(72) Inventors: Akira Hiratsuka, Chigasaki (JP); Kohei Yoshino, Chigasaki (JP); Masayuki Furukawa, Chigasaki (JP); Toshio Harayama, Chigasaki (JP)

(73) Assignee: Ulvac Cryogenics Incorporated, Chigasaki (JP)

( * ) Notice: Subject to any disclaimer, the term of this patent is extended or adjusted under 35 U.S.C. 154(b) by 425 days.

(21) Appl. No.: 18/276,128

(22) PCT Filed: Dec. 27, 2021

(86) PCT No.: PCT/JP2021/048542
§ 371 (c)(1),
(2) Date: Aug. 7, 2023

(87) PCT Pub. No.: WO2022/172634
PCT Pub. Date: Aug. 18, 2022

(65) Prior Publication Data
US 2024/0035722 A1 Feb. 1, 2024

(30) Foreign Application Priority Data
Feb. 10, 2021 (JP) ................................ 2021-019894

(51) Int. Cl.
*B01D 46/30* (2006.01)
*B01D 39/20* (2006.01)
(Continued)

(52) U.S. Cl.
CPC .......... *F25B 43/02* (2013.01); *B01D 39/2017* (2013.01); *B01D 46/30* (2013.01); *F04B 37/08* (2013.01)

(58) Field of Classification Search
CPC .......... F25B 43/02; F25B 9/00; F25B 43/003; B01D 39/2017; B01D 46/30; F04B 37/08; F04B 39/16; F04B 39/04
See application file for complete search history.

(56) References Cited

U.S. PATENT DOCUMENTS 2,511,967 A * 6/1950 Campbell .............. B01D 45/08 210/512.1
4,516,994 A 5/1985 Kocher
(Continued)

FOREIGN PATENT DOCUMENTS

JP S51-47642 A 4/1976
JP S63-22571 U 2/1988
(Continued)

OTHER PUBLICATIONS

International Search Report and Written Opinion dated Jan. 25, 2022, in connection with International Application No. PCT/JP2021/048542.

*Primary Examiner* — Dung H Bui
(74) *Attorney, Agent, or Firm* — Wolf, Greenfield & Sacks, P.C.

(57) ABSTRACT

A compressor oil separator installed in a cryogenic refrigerator compressor includes a first tube that extends in a vertical direction. The first tube includes a first communication portion that connects an inside of the first tube to an outside of the first tube. The compressor oil separator also includes a delivery pipe that extends in the vertical direction and is configured to deliver refrigerant, including oil, to the inside of the first tube. The compressor oil separator also includes a filter located between the first tube and the
(Continued)

delivery pipe in a cross section intersecting the vertical direction. The delivery pipe includes a delivery port that delivers the refrigerant to the inside of the first tube, the delivery port being located downward from a middle part of the first tube in the vertical direction.

5 Claims, 2 Drawing Sheets

(51) Int. Cl.
*F04B 37/08* (2006.01)
*F25B 43/02* (2006.01)

(56) References Cited

U.S. PATENT DOCUMENTS 5,282,370 A * 2/1994 Kiblawi ................ F25B 43/006
138/44
5,961,678 A * 10/1999 Pruette ............... B01D 46/2414
55/528
6,363,742 B1 * 4/2002 Brezuleanu ........... F25B 43/006
62/503
2007/0214827 A1 * 9/2007 Venkatasubramaniam .................
C10M 175/0091
62/84
2011/0056379 A1 3/2011 Lucas
2012/0240537 A1 9/2012 Maruyama
2014/0223954 A1 * 8/2014 Shimada ................... F25B 9/14
62/470
2020/0284486 A1 * 9/2020 Semura ................... F25B 43/02
2024/0035722 A1 * 2/2024 Hiratsuka ................. F25B 9/00

FOREIGN PATENT DOCUMENTS

JP H08-219596 A 8/1996
JP 2006-029684 A 2/2006
JP 2008-039222 A 2/2008
JP 2012-202635 A 10/2012
JP 2016-151381 A 8/2016

* cited by examiner

OIL SEPARATOR FOR COMPRESSOR AND COMPRESSOR FOR CRYOGENIC REFRIGERATOR

CROSS REFERENCE TO RELATED APPLICATIONS

This application is a national stage filing under 35 U.S.C. 371 of International Patent Application Serial No PCT/JP2021/048542, filed Dec. 27, 2021, which claims priority to Japanese application number 2021-019894 filed, Feb. 10, 2021. The entire contents of these applications are incorporated herein by reference in their entirety.

TECHNICAL FIELD

The present invention relates to an oil separator equipped with a compressor for a cryogenic refrigerator and to a compressor for a cryogenic refrigerator.

BACKGROUND ART

A compressor connected to a cryogenic refrigerator includes an oil separator. The oil separator includes a filter device. The filter device includes a first tube, a second tube, a filter, and a refrigerant delivery pipe. In the filter device, the first tube is located at the radially outermost position. The second tube is located in the first tube, and the filter is located between the first tube and the second tube. The delivery pipe has a lower end located in the second tube, and the lower end of the delivery pipe includes a delivery port that is located at an upper end of the second tube. Holes extend through each of the first tube and the second tube. Refrigerant enters the filter device from the delivery port and flows to the filter through the holes of the second tube. The filter separates the refrigerant into oil and cooling gas. The oil captured by the filter moves through the filter under its own weight and accumulates at the lower part of the filter, from where the oil is discharged out of the filter device (refer to, for example, Patent Literature 1).

Patent Literature 1: Japanese Laid-Open Patent Publication No. 2008-039222

SUMMARY

In the filter device, the delivery port of the delivery pipe is located at the upper end of the second tube. Thus, the refrigerant expelled into the second tube from the delivery port is likely to move from the upper part of the second tube toward the upper part of the filter. Consequently, a large amount of oil captured by the filter has to move from the upper part of the filter to the lower part of the filter. Thus, the amount of oil that accumulates at the lower part of the filter is less than the amount of oil that should be discharged from the filter. This reduces the amount of oil discharged from the filter device and, consequently, the oil separator.

It is an objective of the present invention to provide a compressor oil separator and a cryogenic refrigerator compressor that allow oil to be smoothly discharged from the oil separator.

A compressor oil separator according to one aspect is installed in a cryogenic refrigerator compressor. The compressor oil separator includes a first tube, a delivery pipe, and a filter. The first tube, which is tubular and extends in a vertical direction, includes a first communication portion that connects an inside of the first tube to an outside of the first tube. The delivery pipe extends in the vertical direction and is configured to deliver refrigerant, including oil, to the inside of the first tube. The filter is located between the first tube and the delivery pipe in a cross section intersecting the vertical direction. The delivery pipe includes a delivery port that delivers the refrigerant to the inside of the first tube. The delivery port is located downward from a middle part of the first tube in the vertical direction.

A cryogenic refrigerator compressor according to one aspect includes the above compressor oil separator.

In the compressor oil separator, the delivery port is located downward from the middle part of the first tube in the vertical direction. Thus, the refrigerant expelled from the delivery port is supplied more smoothly to the lower part of the filter than the upper part of the filter. This allows oil to accumulate smoothly in the lower part of the filter, and the oil accumulated in the filter is smoothly discharged out of the first tube through the first communication portion of the first tube. Consequently, the oil separated from the refrigerant by the oil separator is smoothly discharged out of the oil separator.

In the above compressor oil separator, the delivery port may include a hole extending through the delivery pipe in a direction intersecting the vertical direction. With the compressor oil separator, the delivery pipe allows more refrigerant to be expelled from the delivery port toward the lower side of the filter than when the delivery pipe includes the delivery port only in its end. This allows the oil captured by the filter to easily accumulate at the lower part of the filter.

In the above compressor oil separator, the hole of the delivery port is each hole of one or more holes extending through the delivery pipe in the direction intersecting the vertical direction, and the delivery pipe includes an end that is located in the first tube. The delivery pipe may include a cover that closes the end.

The compressor oil separator allows refrigerant, which is expelled out of the delivery pipe from the delivery port, to be expelled more smoothly toward the lower part of the filter than the upper part of the filter. Thus, the oil captured by the filter is distributed so as to be increased in amount from the upper side toward the lower side. In this manner, the amount of captured oil decreases toward the upper side of the filter. Thus, less oil will impede the passage of cooling gas, which is separated from oil, at the upper side of the filter. Further, the amount of captured oil increases toward the lower side of the filter. This shortens the distance over which oil falls and allows oil to be smoothly discharged out of the oil separator.

In the above compressor oil separator, the delivery pipe may extend from a lower side toward an upper side in the vertical direction to a position located downward from the middle part of the first tube in the vertical direction. With the above compressor oil separator, the refrigerant flowing through the delivery pipe is delivered to the inside of the first tube from the lower side toward the upper side in the vertical direction. This smoothly supplies the refrigerant throughout the filter, from the upper side to the lower side, and allows the region of the filter that is not used for oil separation to be decreased. As a result, the oil separation efficiency of the filter can be increased.

In the above compressor oil separator, the delivery port may include circular holes extending through the delivery pipe in the direction intersecting the vertical direction. The circular holes may be located toward the end of the delivery pipe in an outer circumferential surface of the delivery pipe.

With the above compressor oil separator, the delivery port includes a plurality of holes. Thus, even when refrigerant cannot be expelled from one hole, the refrigerant can be expelled from other holes. Further, the circular holes are located toward the end. This allows the region where oil is captured in the filter to be expanded in the vertical direction.

The above compressor oil separator may further include a second tube that extends in the vertical direction and is located between the delivery pipe and the filter in the cross section intersecting the vertical direction. The second tube may include an opposing portion that opposes the delivery port in the direction intersecting the vertical direction and a second communication portion that connects an inside of the first tube to an outside of the second tube at a part other than the opposing portion.

With the above compressor oil separator, the second communication portion is not located at the opposing portion. Thus, the refrigerant expelled from the delivery port toward the opposing portion strikes the opposing portion. Accordingly, the refrigerant expelled toward the opposing portion moves downward from the opposing portion to the filter. This shortens the distance over which the oil captured by the filter falls and allows the oil to be smoothly discharged out of the oil separator. Further, the cooling gas separated from the oil passes smoothly through the filter. This allows cooling gas to be smoothly discharged out of the oil separator.

DESCRIPTION OF EMBODIMENTS

First Embodiment

Figure 1:
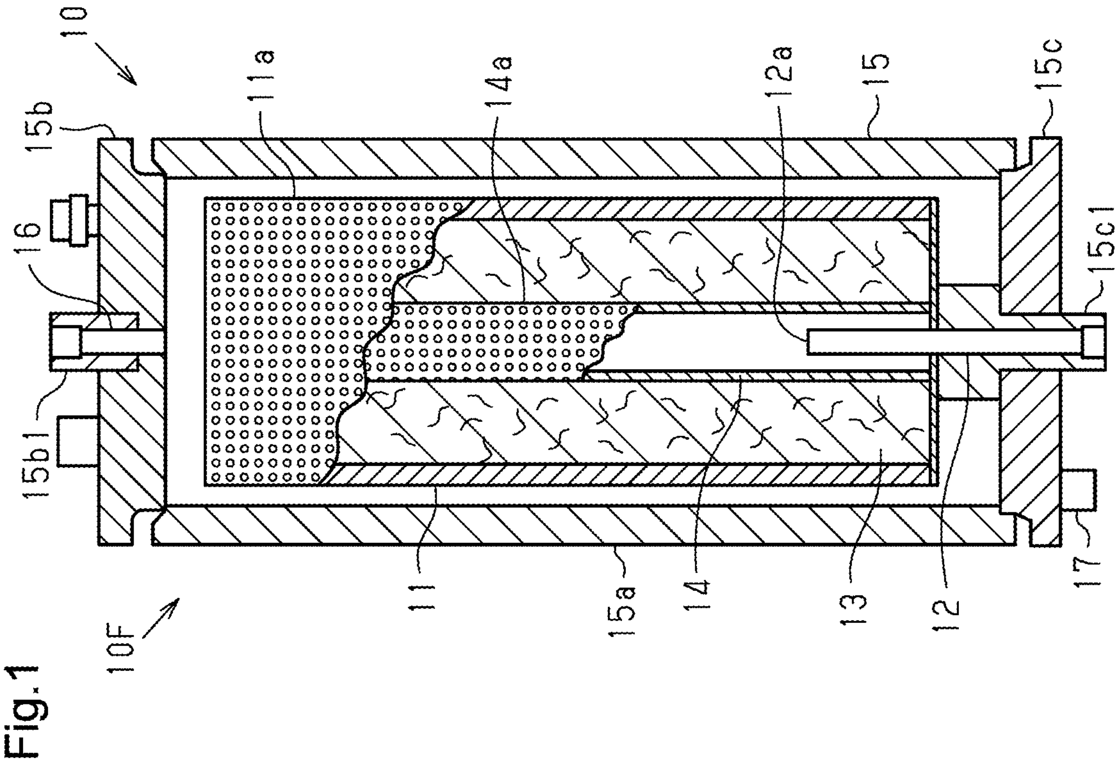
FIG. 1 is a cross-sectional view showing the structure of a first embodiment of a compressor oil separator.
Figure 2:
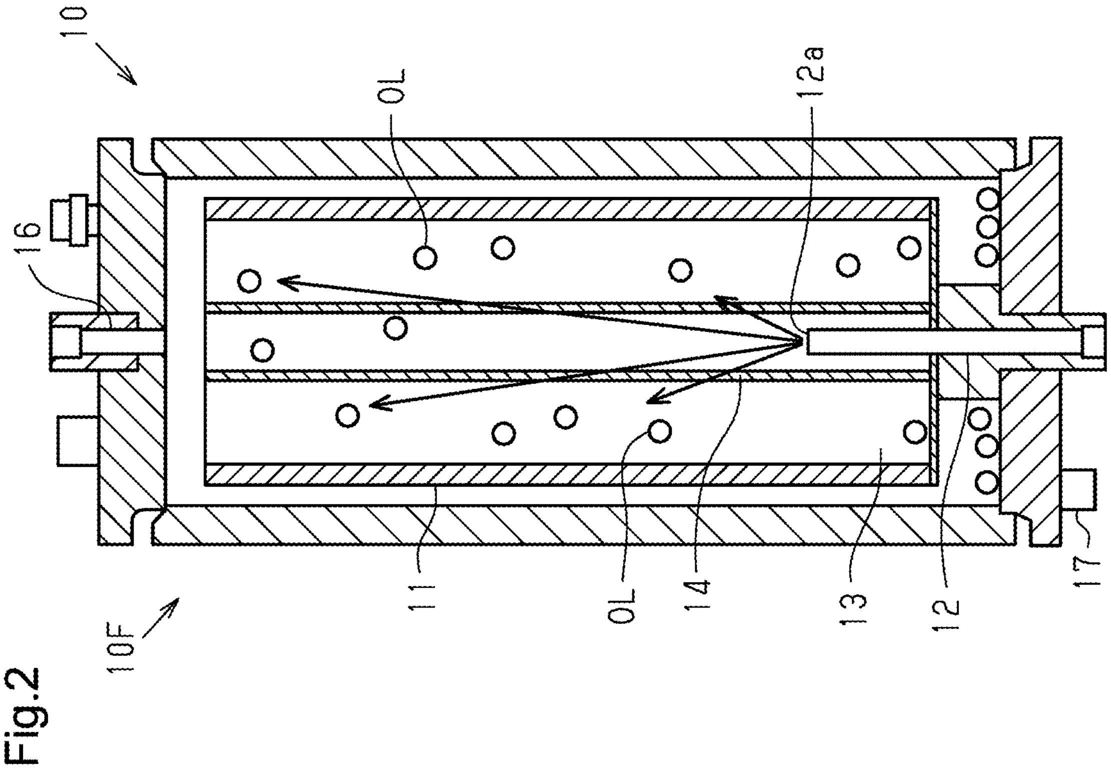
FIG. 2 is a diagram showing how the first embodiment of the compressor oil separator operates.

With reference to FIGS. 1 and 2, a first embodiment of a compressor oil separator and a cryogenic refrigerator compressor will now be described. The compressor oil separator described below is provided in a cryogenic refrigerator that is installed in a cryopump. FIG. 1 shows the cross-sectional structure and end elevational structure of a first tube and a second tube to aid understanding of the structure of each component in the oil separator.

As shown in FIG. 1, a compressor oil separator 10 includes a first tube 11, a delivery pipe 12, and a filter 13. The first tube 11, which is tubular and extends in a vertical direction, includes a first communication portion 11*a* that connects the inside of the first tube 11 to the outside of the first tube 11. The delivery pipe 12 extends in the vertical direction and delivers refrigerant, including oil, to the inside of the first tube 11. The filter 13 is located between the first tube 11 and the delivery pipe 12 in a cross section intersecting the vertical direction. The delivery pipe 12 includes a delivery port 12*a* that delivers refrigerant to the inside of the first tube 11. The delivery port 12*a* is located downward from a middle part of the first tube 11 in the vertical direction.

Since the delivery port 12*a* is located downward from the middle part of the first tube 11 in the vertical direction, the refrigerant expelled from the delivery port 12*a* is supplied more smoothly to the lower part of the filter 13 than the upper part of the filter 13. This allows oil to accumulate smoothly in the lower part of the filter 13, and the oil accumulated in the filter 13 is smoothly discharged out of the first tube 11 through the first communication portion 11*a* of the first tube 11. Consequently, the oil separated from the refrigerant by the oil separator 10 is smoothly discharged out of the oil separator 10.

The delivery pipe 12 extends from a lower side toward an upper side in the vertical direction to a position located downward from the middle part of the first tube 11 in the vertical direction. Thus, the refrigerant flowing through the delivery pipe 12 is delivered to the inside of the first tube 11 from the lower side toward the upper side in the vertical direction. This smoothly supplies the refrigerant throughout the filter 13, from the upper side to the lower side, and allows the region in the filter 13 that is not used for oil separation to be decreased. As a result, the oil separation efficiency of the filter 13 can be increased.

The refrigerant is a cooling gas including the oil described above. The cooling gas is, for example, helium gas. A compressor provided with the oil separator 10 includes a pump in a passage through which the refrigerant flows at the upstream side of the oil separator 10 to increase the pressure of the refrigerant. The refrigerant reaches the oil separator 10 in a state in which its pressure is increased. Thus, the pressure-increased refrigerant is expelled from the delivery port 12*a* of the delivery pipe 12 into the first tube 11.

The oil separator 10 further includes a second tube 14 and a case 15. The second tube 14 is located between the delivery pipe 12 and the filter 13 in a cross section intersecting the vertical direction. The second tube 14 includes a second communication portion 14*a* that connects the inside of the second tube 14 and the outside of the second tube 14 in a direction intersecting the vertical direction. The case 15 is located outward from the first tube 11.

The first tube 11 has the form of a circular tube. The first communication portion 11*a* of the first tube 11 includes holes extending through the first tube 11 in the radial direction of the first tube 11. The holes are arranged in a regular manner in the vertical direction and radial direction (or circumferential direction) of the first tube 11. For example, a sheet of punching metal is shaped into a circular tube to form the first tube 11. The first tube 11 may be formed from a metal tubing including holes.

The second tube 14 has the form of a circular tube. The second tube 14 is disposed in the first tube 11 so that the axis of the second tube 14 coincides with the axis of the first tube 11. The second tube 14 and the first tube 11 are equal in length in the vertical direction. In the same manner as the first communication portion 11*a*, the second communication portion 14*a* of the second tube 14 includes holes extending through the second tube 14 in the radial direction of the second tube 14. The holes are arranged in a regular manner in the vertical direction and radial direction (or circumferential direction) of the second tube 14. For example, a sheet of punching metal is shaped into a circular tube to form the second tube 14. The second tube 14 may be formed from a metal tubing including holes.

The delivery pipe 12 has the form of a circular tube. Part of the delivery pipe 12 is located in the second tube 14. The portion of the delivery pipe 12 located in the second tube 14 is disposed in the second tube 14 so that the axis of the delivery pipe 12 coincides with the axis of the second tube 14. The delivery pipe 12 includes two ends, an upper end and a lower end. In the example of FIG. 1, the upper end is located in the second tube 14. The delivery port 12*a*, which is described above, is located in the upper end of the delivery pipe 12 and is open toward the upper side. Namely, in the first embodiment, the delivery port 12*a* of the delivery pipe 12 is formed by a single opening. Further, the delivery port 12*a* passes the refrigerant in the vertical direction from the lower side toward the upper side. The delivery pipe 12 is formed by, for example, a metal pipe.

The first tube 11, the second tube 14, and the delivery pipe 12, which are described above, are members forming a filter device 10F. In the filter device 10F, the upper end of the first tube 11 and the upper end of the second tube 14 are closed by the same lid member. Further, the lower end of the first tube 11 and the lower end of the second tube 14 are closed by the same lid member. The filter device 10F is supported by the delivery pipe 12 and a support 15*c*1.

The filter 13 is located between the first tube 11 and the second tube 14 in the radial direction of the first tube 11. The filter 13 separates the refrigerant into oil and cooling gas. When the filter 13 is supplied with the refrigerant, the filter 13 captures only oil from the refrigerant. The filter 13 does not capture cooling gas from the refrigerant. In this manner, the filter 13 separates oil from cooling gas. The filter 13 is, for example, glass wool. The filter 13 fills the entire space between the first tube 11 and the second tube 14.

The case 15 includes a main body 15*a*, an upper lid 15*b*, and a lower lid 15*c*. The main body 15*a*, which is tubular and extends in the vertical direction, accommodates the filter device 10F. The main body 15*a* includes an upper end, in the vertical direction, closed by the upper lid 15*b*, and a lower end, in the vertical direction, closed by the lower lid 15*c*. The upper lid 15*b* includes a support 15*b*1 that supports a gas discharge pipe 16, which is used to discharge the cooling gas. The lower lid 15*c* includes the support 15*c*1. The lower lid supports an oil discharge pipe 17, which is used to discharge oil.

FIG. 2 is a diagram showing how the oil separator 10 operates. In FIG. 2, to aid understanding of how the oil separator 10 operates, circles indicate the oil OL included in the refrigerant, and arrows indicate the paths of the refrigerant delivered to the inside of the filter device 10F from the delivery port 12*a*.

As shown in FIG. 2, in the oil separator 10, the delivery port 12*a*, which is located downward from the middle part of the first tube 11, delivers refrigerant from the lower side toward the upper side in the vertical direction. Thus, the refrigerant expelled from the delivery port 12*a* is dispersed throughout the filter 13 in the vertical direction through the second tube 14. This allows the region of the filter 13 that is not used to separate the oil OL to be decreased and thus increases the efficiency of the filter device 10F for separating the oil OL.

The oil OL captured by the filter 13 moves downward through the filter 13 under its own weight and accumulates at the lower part of the filter 13. The oil OL accumulated at the lower part of the filter 13 is discharged out of the filter device 10F through the first communication portion 11*a* of the first tube 11. The oil OL discharged out of the filter device 10F is accumulated on the lower lid 15*c* of the case 15 and then discharged out of the oil separator 10 through the oil discharge pipe 17 supported by the lower lid 15*c*. The cooling gas separated from the oil OL by the filter device 10F is discharged out of the oil separator through the gas discharge pipe 16.

As described above, the first embodiment of the compressor oil separator and the cryogenic refrigerator compressor have the following advantages.

(1-1) The delivery port 12*a* of the delivery pipe 12 is located downward from the middle part of the first tube 11. Thus, more refrigerant, which is expelled from the delivery port 12*a*, is supplied to the lower part of the filter 13 than the upper part. This allows oil OL to easily accumulate in the lower part of the filter 13 so that the oil OL accumulated in the filter 13 is smoothly discharged out of the first tube 11 through the first communication portion 11*a* of the first tube 11. As a result, the oil separated from the refrigerant by the oil separator 10 is smoothly discharged out of the oil separator 10.

(1-2) The delivery pipe 12 is inserted into the first tube 11 from the lower end of the first tube 11 so as to extend from the lower side toward the upper side in the vertical direction, and the delivery port 12*a* is located downward from the middle part of the first tube 11 in the vertical direction. Thus, refrigerant flows through the delivery pipe 12 from the lower side toward the upper side in the vertical direction and is delivered to the inside of the first tube 11 (refer to FIG. 2). This smoothly supplies the refrigerant to the entire filter 13, from the upper side to the lower side of the filter 13, and allows the region in the filter 13 that is not used to separate the oil OL to be decreased. As a result, the efficiency of the filter 13 for separating the oil OL can be increased.

The first embodiment may be modified as described below.

Delivery Pipe

The delivery pipe 12 may extend from the upper side toward the lower side in the vertical direction, and the delivery port 12*a* may be located downward from the middle part of the first tube 11. That is, the delivery pipe 12 may deliver the refrigerant, which is directed from the upper side toward the lower side in the vertical direction, to the inside of the first tube 11. In this case, the delivery pipe 12 includes the delivery port 12*a* that is also located downward from the middle part of the first tube 11. Thus, advantage (1-1), described above, is obtained.

Second Embodiment

Figure 4:
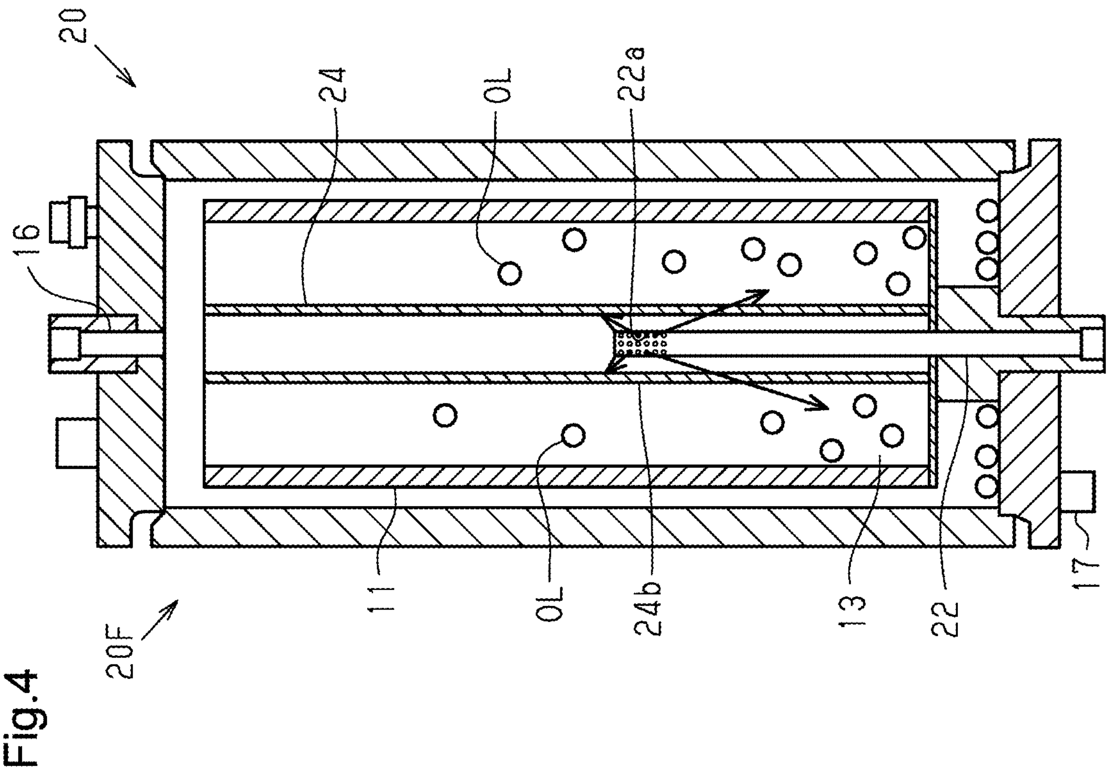
FIG. 4 is a diagram showing how the second embodiment of the compressor oil separator operates.
Figure 3:
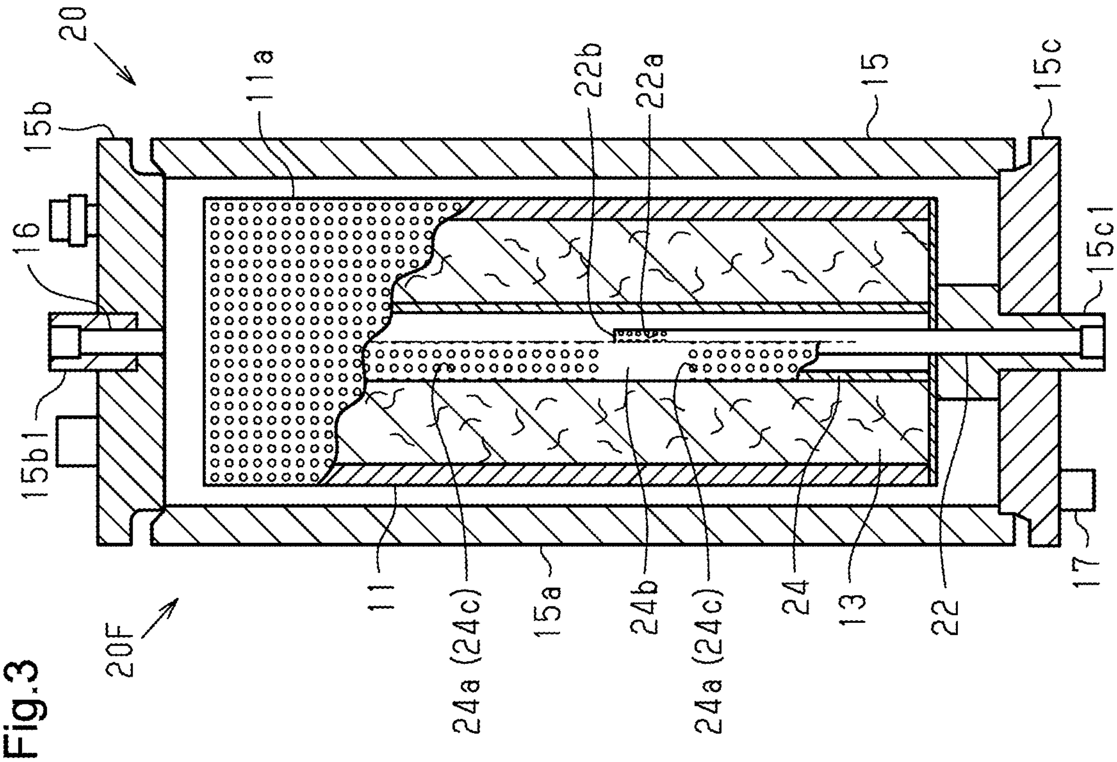
FIG. 3 is a cross-sectional view showing the structure of a second embodiment of a compressor oil separator.

With reference to FIGS. 3 and 4, a second embodiment of a compressor oil separator and a cryogenic refrigerator compressor will now be described. The second embodiment of the compressor oil separator differs from the first embodiment of the compressor oil separator in the structures of the delivery pipe and the second tube that are provided in the filter device. The differences between the first embodiment of the compressor oil separator and the second embodiment of the compressor oil separator will now be described in detail. Same reference numerals are given to those components that are the same as the corresponding components of the compressor oil separators in the first and second embodiments. Such components will not be described in detail.

FIG. 3 shows the cross-sectional structure and end elevational structure of the first tube to aid understanding of the structure of each component in the oil separator. Further, in FIG. 3, one side (left side) of the axis of the second tube shows the cross-sectional structure and end elevational structure of the second tube, and the other side (right side) shows the cross-sectional structure of the second tube.

As shown in FIG. 3, an oil separator 20 includes the first tube 11, a delivery pipe 22, and the filter 13 in the same manner as the oil separator 10 of the first embodiment. In the same manner as the first embodiment, the delivery pipe 22 also includes a delivery port 22*a* located downward from the middle part of the first tube 11. The delivery port 22*a* of the delivery pipe 22 includes one or more holes extending through the delivery pipe 22 in a direction intersecting the vertical direction. In the second embodiment, the delivery pipe 22 has the form of a circular tube, and the delivery port 22*a* is formed by one or more holes extending through the delivery pipe 22 in the radial direction of the delivery pipe 22. The delivery pipe 22 includes an end that is located in the first tube 11 and a cover 22*b* that closes the end. Thus, in the example of FIG. 3, the upper end surface of the delivery pipe 22 is closed.

The delivery pipe 22 includes the delivery port 22*a* and the cover 22*b*. Thus, the refrigerant expelled from the delivery port 22*a* out of the delivery pipe 22 is expelled more smoothly toward the lower part of the filter 13 than the upper part of the filter 13. Thus, the oil captured by the filter 13 is distributed so as to be increased in amount from the upper side toward the lower side.

In this manner, the amount of captured oil decreases toward the upper side of the filter 13. Thus, less oil will impede the passage of cooling gas, which is separated from the refrigerant, at the upper side of the filter 13. Further, the amount of captured oil increases toward the lower side of the filter 13. This shortens the distance over which oil falls and allows oil to be smoothly discharged out of the oil separator 20.

In the example shown in FIG. 3, the delivery port 22*a* includes circular holes extending through the delivery pipe 22 in the radial direction of the delivery pipe 22. The circular holes are located toward an end of the delivery pipe 22 in the outer circumferential surface of the delivery pipe 22. In the example of FIG. 3, the delivery port 22*a* is located toward an upper end of the delivery pipe 22 in the outer circumferential surface. The delivery port 22*a* includes a plurality of holes. Thus, even when refrigerant cannot be expelled from one hole, the refrigerant can be expelled from other holes. Further, the circular holes are located toward the upper end. This allows the region where oil is captured in the filter 13 to be expanded in the vertical direction.

In the example shown in FIG. 3, the circular holes are arranged at intervals in the circumferential and axial directions of the delivery pipe 22. Thus, the amount of refrigerant expelled from the delivery pipe 22 will be uniform in the circumferential direction of the delivery pipe 22.

A second tube 24 includes an opposing portion 24*b* that opposes the delivery port 22*a* in the vertical direction. In the second embodiment, the second tube 24 has the form of a circular tube, and the opposing portion 24*b* opposes the delivery port 22*a* in the radial direction of the second tube 24. The second tube 24 includes a second communication portion 24*a* that connects the inside of the second tube 24 and the outside of the second tube 24 at a part other than the opposing portion 24*b*. The second tube 24 includes two non-opposing portions 24*c* sandwiching the opposing portion 24*b* in the vertical direction. The second communication portion 24*a* includes holes, with a first group of the holes located in the upper non-opposing portion 24*c* and a second group of the holes located in the lower non-opposing portion 24*c*.

The opposing portion 24*b* does not include the second communication portion 24*a*. Thus, the refrigerant expelled from the delivery port 22*a* and directed toward the opposing portion 24*b* will strike the opposing portion 24*b*. Consequently, the refrigerant expelled toward the opposing portion 24*b* moves downward from the opposing portion 24*b* to the filter 13. This shortens the distance, over which the oil captured by the filter 13 moves under its own weight, and allows oil to be smoothly discharged out of the oil separator 20. Further, the cooling gas separated from the refrigerant passes smoothly through the filter 13. This allows cooling gas to be smoothly discharged out of the oil separator 20.

In the same manner as the second tube 14 of the first embodiment, the second tube 24 may be formed from a metal sheet or a metal tubing. In this case, no holes are formed in the metal sheet or the metal tubing at a portion corresponding to the opposing portion 24*b* so that the second tube 24 includes the opposing portion 24*b* and the non-opposing portions 24*c*. Further, the second tube 24 may be formed by a plate member including holes arranged throughout in the vertical direction and a plate member including no holes. In this case, the plate member including no holes is arranged on the plate member including holes at a portion corresponding to the opposing portion 24*b*.

FIG. 4 is a diagram showing how the oil separator 20 operates. In FIG. 4, to aid understanding of how the oil separator 20 operates, in the same manner as FIG. 2, circles indicate the oil OL included in the refrigerant, and arrows indicate the paths of the refrigerant delivered to the inside of the filter device 20F from the delivery port 22*a*.

As shown in FIG. 4, in the oil separator 20, the refrigerant expelled from the delivery port 22*a* strikes the opposing portion 24*b* so that the refrigerant smoothly moves downward from the opposing portion 24*b*. This distributes oil OL so that the amount of oil OL captured by the filter 13 increases toward the lower side of the filter 13. In this manner, the amount of captured oil OL decreases toward the upper side of the filter 13. Thus, less oil OL will impede the passage of cooling gas, which is separated from the refrigerant, at the upper side of the filter 13. Further, the amount of captured oil OL increases toward the lower side of the filter 13. This shortens the distance, over which oil OL moves under its own weight, and allows oil OL to be smoothly discharged out of the oil separator 20.

As described above, the second embodiment of the compressor oil separator and the cryogenic refrigerator compressor have the following advantages.

(2-1) The delivery port 22*a* of the delivery pipe 22 is located downward from the middle part of the first tube 11. Thus, more refrigerant, which is expelled from the delivery port 22*a*, is supplied to the lower part of the filter 13 than the upper part. This allows oil OL to easily accumulate in the lower part of the filter 13 so that the oil OK accumulated in the filter 13 is smoothly discharged out of the first tube 11 through the first communication portion 11*a* of the first tube 11. As a result, the oil OL separated from the refrigerant by the oil separator 20 is smoothly discharged out of the oil separator 20.

(2-2) The delivery pipe 22 is inserted into the first tube 11 from the lower end of the first tube 11 so as to extend from the lower side toward the upper side in the vertical direction, and the delivery port 22*a* is located downward from the middle part of the first tube 11 in the vertical direction. Thus, refrigerant flows through the delivery pipe 22 from the lower side toward the upper side in the vertical direction and is delivered to the inside of the first tube 11 (refer to FIG. 4). This smoothly supplies the refrigerant to the entire filter 13, from the upper side to the lower side of the filter 13, and allows the region in the filter 13 that is not used to separate the oil OL to be decreased. As a result, the efficiency of the filter 13 for separating the oil OL can be increased.

(2-3) The delivery port 22*a* of the delivery pipe 22 includes one or more holes extending through the delivery pipe 22 in a direction intersecting the vertical direction. Thus, more refrigerant is expelled toward the lower side of the filter 13 than when a delivery port is located at the upper side. This increases the amount of oil OL captured at the lower side of the filter 13. In this manner, the amount of captured oil OL decreases toward the upper side of the filter 13. Thus, less oil OL will impede the passage of cooling gas, which is separated from the refrigerant, at the upper side of the filter 13. Further, the amount of captured oil OL increases toward the lower side of the filter 13. This shortens the distance, over which oil OL moves under its own weight, and allows oil OL to be smoothly discharged out of the oil separator 20.

(2-4) The delivery port 22*a* includes a plurality of holes. Thus, even when refrigerant cannot be expelled from one hole, the refrigerant can be expelled from other holes. Further, the circular holes are located toward the end (upper end in FIG. 3) of the delivery pipe 22. This allows the region where oil OL is captured in the filter 13 to be expanded in the vertical direction.

(2-5) The refrigerant expelled from the delivery port 22*a* toward the opposing portion 24*b* strikes the opposing portion 24*b* and moves downward from the opposing portion 24*b* to the filter 13. This shortens the distance, over which the oil OL captured by the filter 13 moves under its own weight, and allows oil OL to be smoothly discharged out of the oil separator 20. Further, the cooling gas separated from the refrigerant passes smoothly through the filter 13. This allows cooling gas to be smoothly discharged out of the oil separator 20.

The second embodiment may be modified as described below.

Delivery Pipe

The delivery pipe 22 of the second embodiment may further include the delivery port 12*a* of the delivery pipe 12 in the first embodiment. In this case, the delivery pipe 22 will also include a hole (delivery port 22*a*) extending through the delivery pipe 22 in a direction intersecting the vertical direction. This will obtain the advantage described below.

(2-6) The delivery pipe 22 includes the delivery port 12*a* in addition to the delivery port 22*a* of the second embodiment. This increases the amount of refrigerant expelled from the delivery ports 12*a* and 22*a* toward the lower side of the filter 13. Thus, the oil captured by the filter 13 easily accumulates at the lower part of the filter 13.

10, 20) oil separator
11) first tube
12, 22) delivery pipe
12*a*, 22*a*) delivery port
13) filter
14, 24) second tube
24*b*) opposing portion
15) case
16) gas discharge pipe
17) oil discharge pipe

The invention claimed is:

1. A compressor oil separator installed in a cryogenic refrigerator compressor, the compressor oil separator comprising:

a first tube that is tubular and extends in a vertical direction, the first tube including a first communication portion that connects an inside of the first tube to an outside of the first tube;

a delivery pipe that extends in the vertical direction and is configured to deliver refrigerant, including oil, to the inside of the first tube;

a filter located between the first tube and the delivery pipe in a cross section intersecting the vertical direction; and a second tube that extends in the vertical direction and is located between the delivery pipe and the filter in the cross section intersecting the vertical direction, wherein;

the delivery pipe includes a delivery port that delivers the refrigerant to the inside of the first tube, the delivery port being located downward from a middle part of the first tube in the vertical direction, the delivery port includes a hole extending through the delivery pipe in a direction intersecting the vertical direction; and the second tube includes an opposing portion that opposes the delivery port in the direction intersecting the vertical direction and a second communication portion that connects an inside of the second tube to an outside of the second tube at a part other than the opposing portion, the opposing portion being devoid of the second communication portion, and the delivery pipe includes an end located within the first tube and a cover that closes the end.

2. The compressor oil separator according to claim 1, wherein:

the hole of the delivery port is each hole of one or more holes extending through the delivery pipe in the direction intersecting the vertical direction.

3. The compressor oil separator according to claim 2, wherein:

the delivery port includes circular holes extending through the delivery pipe in the direction intersecting the vertical direction; and the circular holes are located toward the end of the delivery pipe in an outer circumferential surface of the delivery pipe.

4. The compressor oil separator according to claim 1, wherein the delivery pipe extends from a lower side toward an upper side to a position located downward from the middle part of the first tube in the vertical direction.

5. A cryogenic refrigerator compressor, comprising:

the compressor oil separator according to claim 1.

* * * * *